(12) United States Patent
Karlsson et al.

(10) Patent No.: US 10,924,901 B2
(45) Date of Patent: Feb. 16, 2021

(54) DISTRIBUTED WIRELESS COMMUNICATION SYSTEM FOR MOVING VEHICLES

(71) Applicant: ICOMERA AB, Gothenburg (SE)

(72) Inventors: Mats Karlsson, Gothenburg (SE);
Peter Eklund, Gothenburg (SE)

(73) Assignee: ICOMERA AB, Gothenburg (SE)

( * ) Notice: Subject to any disclaimer, the term of this patent is extended or adjusted under 35 U.S.C. 154(b) by 425 days.

(21) Appl. No.: 15/644,722

(22) Filed: Jul. 7, 2017

(65) Prior Publication Data
US 2018/0020334 A1 Jan. 18, 2018

(30) Foreign Application Priority Data

Jul. 14, 2016 (SE) ...................................... 1651060

(51) Int. Cl.
*H04W 4/42* (2018.01)
*H04W 4/48* (2018.01)
(Continued)

(52) U.S. Cl.
CPC ............ *H04W 4/42* (2018.02); *H04B 7/0413* (2013.01); *H04L 41/0806* (2013.01);
(Continued)

(58) Field of Classification Search
CPC ....... H04W 8/26; H04W 40/12; H04W 8/183; H04W 48/18; H04W 4/42; H04W 4/48;
(Continued)

(56) References Cited

U.S. PATENT DOCUMENTS

2002/0133825 A1* 9/2002 Rufilanchas ............. H04N 7/18
725/75
2010/0240414 A1 9/2010 Lotenberg
(Continued)

FOREIGN PATENT DOCUMENTS

EP 1 175 757 B1 1/2005
EP 2 518 977 A1 10/2012
(Continued)

OTHER PUBLICATIONS

Extended European Search Report issued in EP 17177903.6, dated Mar. 12, 2018, European Patent Office, Munich, DE, 27 pages.
(Continued)

*Primary Examiner* — Oussama Roudani
(74) *Attorney, Agent, or Firm* — Buchanan Ingersoll & Rooney P.C.

(57) ABSTRACT

A wireless communication system and method for a moving vehicle having a plurality of carriages is disclosed. The system includes a plurality of routers, each router being arranged in a separate carriage and each router being configured to receive and transmit wireless data communication to and from a stationary communication server outside said moving vehicle through at least one exterior mobile network via at least one antenna, wherein said at least one exterior mobile network provides at least one data link; receive and transmit data packets to and from at least one client onboard the moving vehicle; and communicate with every other router in said moving vehicle in order to receive and transmit data packets to and from said every other router, thereby forming an onboard router network.

17 Claims, 2 Drawing Sheets

(51) Int. Cl.
*H04W 48/18* (2009.01)
*H04W 8/18* (2009.01)
*H04B 7/0413* (2017.01)
*H04L 12/24* (2006.01)
*H04W 8/26* (2009.01)
*H04W 40/12* (2009.01)
*H04W 4/46* (2018.01)
*H04W 4/029* (2018.01)
*H04W 84/00* (2009.01)

(52) U.S. Cl.
CPC ............... *H04L 41/12* (2013.01); *H04W 4/48* (2018.02); *H04W 8/183* (2013.01); *H04W 8/26* (2013.01); *H04W 40/12* (2013.01); *H04W 48/18* (2013.01); *H04W 4/029* (2018.02); *H04W 4/46* (2018.02); *H04W 84/005* (2013.01)

(58) Field of Classification Search
CPC ..... H04W 84/005; H04W 4/029; H04W 4/46; H04W 40/026; H04W 88/005; H04L 41/12; H04L 45/121; H04L 41/0806; H04B 7/0413
See application file for complete search history.

(56) References Cited

U.S. PATENT DOCUMENTS

| | | | | |
|---|---|---|---|---|
| 2011/0222426 | A1 | 9/2011 | Chazel et al. | |
| 2012/0275445 | A1* | 11/2012 | Karlsson | H04W 8/183 370/338 |
| 2013/0065557 | A1* | 3/2013 | Zhang | H04W 12/06 455/411 |
| 2014/0146749 | A1* | 5/2014 | Barker | H04W 40/026 370/328 |
| 2014/0189167 | A1* | 7/2014 | Joergensen | G06F 1/206 710/16 |
| 2014/0204832 | A1* | 7/2014 | Van Phan | H04W 88/10 370/315 |
| 2014/0245003 | A1* | 8/2014 | Barker | H04L 63/08 713/168 |
| 2014/0336850 | A1 | 11/2014 | Kim et al. | |
| 2016/0094985 | A1 | 3/2016 | Chong et al. | |
| 2016/0249233 | A1* | 8/2016 | Murray | B61L 27/0005 |
| 2017/0170856 | A1* | 6/2017 | Shen | H04B 1/3816 |

FOREIGN PATENT DOCUMENTS

| | | |
|---|---|---|
| EP | 0 739 090 A1 | 6/2014 |
| EP | 2739090 A1 | 6/2014 |
| EP | 2 773 140 A1 | 9/2014 |
| EP | 2 943 011 A1 | 11/2015 |
| WO | 2010/018529 A1 | 2/2010 |
| WO | 2010/049595 A1 | 5/2010 |
| WO | 2012/110771 A2 | 8/2012 |
| WO | 2012171585 A1 | 12/2012 |
| WO | 2015/059496 A1 | 4/2015 |
| WO | 2015/059496 A9 | 4/2015 |
| WO | 2016/013968 A1 | 1/2016 |

OTHER PUBLICATIONS

Tso et al. "DragonNet: A robust mobile Internet service system for long distance trains" INFOCOM, 2011 Proceedings IEEE, pp. 855-863, published Apr. 10, 2011 doi:10.1109/INFOCOM.2011. 5935309.
Search Report issued by the Swedish Patent and Registration Office for Patent Application No. 1651060-4, dated Jan. 19, 2017 (13 pages).
Partial European Search Report dated Dec. 11, 2017, issued by the European Patent Office in corresponding European Application No. 17177903.6 (27 pages).

* cited by examiner

DISTRIBUTED WIRELESS COMMUNICATION SYSTEM FOR MOVING VEHICLES

TECHNICAL FIELD OF THE INVENTION

The present invention relates to a wireless communication system for moving vehicles, such as trains.

BACKGROUND

The demands on wireless communication capabilities in today's society are increasing rapidly. In particular, there is an increasing demand from passengers to be able to communicate through mobile phones and other handheld devices when traveling. Furthermore, there is also a rapidly growing demand to be able to get access to the Internet with laptops, PDAs, smartphones, and the like when traveling, for example, by train. However, train carriages are made of metal, and even the windows are normally covered with a thin metal film. Thus, train carriages are often shielded compartments, and direct communication between terminal antennas within the carriages and externally located antennas is difficult to obtain. Further, in regards to recent developments in the field of smartphones, and the way these are commonly used, with e.g. continuously operating applications, many smartphones are active at all times, meaning that many handovers are required when the train moves. Even though this problem is common for all moving vehicles, it is especially pronounced for vehicles moving at high speed, such as trains.

The mobile nature of a client with respect to the base stations may also introduce several potential sources of communication performance degradation. Such sources may derive from complex terrain, competition for available channels, or the source may be an unknown source of noise related to e.g. radio-frequency interference.

To this end, moving vehicles, such as train carriages, are often provided with an external antenna connected to a repeater unit within the carriage, which in turn is connected to an internal antenna. Hence, the communication between the passengers' terminals (e.g. handheld devices) and the operator antennas outside the vehicle occurs through the repeater unit. Similarly, it is known to provide a mobile access router for data communication, also connected both to an external antenna and an internal antenna, in each carriage, in order to provide Internet access on board the vehicle. Such mobile access router solutions are e.g. commercially available from the applicant of the present application, Icomera AB, of Gothenburg, Sweden, and are also disclosed in EP 1 175 757 by the same applicant. This method has greatly improved the reliability of high-bandwidth wireless communication for trains and other large vehicles. However, this solution may still be insufficient to obtain an optimal transmission performance, especially for large data volumes. Trains and other moving vehicles often pass through areas with bad radio coverage, and moreover, present solutions are often unable to properly handle the large amount of traffic.

Further, in the light of recent developments regarding wireless communication methods and systems, such as e.g. developments relating to MIMO (multiple-input multiple-output) technology, presently known wireless communication systems for trains are becoming more and more outdated. Thus, current systems are unable to make efficient use and benefit of the developments made in new telecom techniques, such as MIMO, and are often even incapable of integrating such techniques at all.

Yet further, MIMO systems aside, the practical limitations caused by the limited amount of space on the roof of a train carriage is forming a bottle-neck for the bandwidth capacity for the onboard communication system.

There is therefore a need for an improved train communication system which provides better capacity and more efficient utilization of external mobile networks. Even though the above discussion is focused on trains, similar situations and problems are at least to some extent encountered in other types of moving multi-carriage vehicles, such as trams.

SUMMARY OF THE INVENTION

It is therefore an object of the present invention to provide a wireless communication system and a method for wireless communication for moving vehicles, and in particular trains, which alleviates all or at least some of the above-discussed drawbacks of the presently known systems.

Another object of the invention is to provide a wireless communication system for moving vehicles which is dynamic and robust against onboard network configurations with undersized or oversized network capacity.

These objects are achieved by means of a wireless communication system for a moving vehicle as defined in the appended claims. The term exemplary is in the following to be interpreted as; serving as an example, instance, or illustration.

According to a first aspect of the present invention, there is provided a wireless communication system for a moving vehicle, such as a train, having a plurality of carriages, said wireless communication system comprising:

a plurality of routers, each router being arranged in a separate carriage and each router being configured to:
  receive and transmit wireless data communication to and from a stationary communication server outside the moving vehicle through at least one exterior mobile network via at least one antenna, wherein the at least one exterior mobile network provides at least one data link;
  receive and transmit data packets to and from at least one client onboard the moving vehicle;
  communicate with every other router in the moving vehicle in order to receive and transmit data packets to and from every other router, thereby forming an onboard router network;
at least one controller configured to evaluate a set of performance parameters of the at least one data link between each router and the at least one exterior mobile network in order to assign data streams to the at least one data link, through the onboard router network, at least partly based on the evaluated set of performance parameters.

Such a system improves the traveling experience for customers and is more compatible with current technological trends than presently known wireless communication system for moving vehicles. Moreover the system is effectively provided with means to distribute data traffic within the onboard router network in an optimal way improving the overall performance of the system.

Each "router" (or sometimes "mobile router") is a networking router, which is a machine that forwards data packets between computer networks, on at least one data link. The routers may be mobile access routers, and preferably a mobile access and applications routers.

In accordance with one exemplary embodiment, the wireless communication system comprises one controller for each router and wherein each controller is configured to:

evaluate a set of performance parameters of the at least one data link between the router and the at least one exterior mobile network, in order to assign data streams to the at least one data link, through the onboard router network, at least partly based on the evaluated set of performance parameters. The controller can be provided by means of appropriate software, hardware or a combination thereof. In this exemplary embodiment, each controller is in operative connection with one individual router and is able to communicate with other controllers onboard the moving vehicle through the router network. The controller may be partly or wholly integrated into the router or a standalone unit connected to the router. Optionally, the system may comprise only one single central controller in operative connection with each individual router on board the vehicle.

A set of internal LANs may be provided inside the moving vehicle for providing (wireless) communication between each individual router and at least one client (sometimes referred to as terminal) onboard. In one exemplary embodiment, each internal LAN may provide WiFi communication between one router of the plurality of routers and at least one client onboard the moving vehicle. In other words, each carriage is preferably only associated with one internal LAN provided by one router, however, the inventive system allows each client to have indirect access to the other routers via the onboard router network. Moreover, the at least one client onboard may accordingly be connected to one of the plurality of routers via a LAN (local area network) provided by one or more wireless access points within the public transport vehicle. Preferably, at least one such wireless access point is provided in each carriage. Each wireless access point is to be connected to a specific router of the plurality of routers, such that a plurality of clients (or terminals) onboard the moving vehicle are effectively distributed among the plurality of routers by dependence on the location of each client within the moving vehicle.

The plurality of routers may be spread out and arranged in specific carriages of the moving vehicle, such as e.g. in a front passenger carriage, a back passenger carriage and/or a café carriage. However, each carriage in the moving vehicle may also be provided with a separate router connected to at least one wireless access point in the same carriage, where the wireless access point may be external to the router or an integrated function of the router.

"Data streams" are traffic in need of routing. A stream is in the context of the present application to be seen as any and all communication with a specific combination of ultimate source and ultimate destination IP addresses and network ports, or whatever the equivalent of this would be in a networking scheme where these identifiers are not used or not sufficiently distinguishing. A stream is "created" when any entity on one side of the system seeks to communicate with any entity on the other side, using any specific combination of ports.

Each stationary communication server may be any server or site accessible through the exterior mobile network, such as a DNS server, an ISP infrastructure gateway, an aggregation gateway, a content provider server of interest to vehicle passengers, or the like. For all common applications of this invention, the stationary servers will constitute the Internet, but partly or purely private network applications are also feasible.

Each router and the remote server (stationary communication server) are preferably connected through a plurality of exterior mobile networks, which are simultaneously useable. Also, each router is preferably arranged to communicate with the stationary communication server on at least two different data links (communication routes) having different characteristics, i.e. performance parameters, where the performance parameters can be measured and evaluated by the controller. This may be used to evaluate and links provided by a single router, and to distribute data streams between these links, but may also be used to evaluate links provided by two or more routers, each router providing only one or a limited number of links, and then distributing the data streams between these links accessible through different routers.

The different routers are furthermore preferably arranged to communicate on different data links, i.e. each router is preferably arranged to communicate on at least one different data link as compared to the other routers onboard the moving vehicle. The performance parameters may include at least one of: packet loss (intermittent failure for packets of data to arrive), latency (round-trip response time, hence responsiveness), throughput/bandwidth (overall rate of data transmission, whether current or potential) and a variety of radiophysical metrics, such as signal strength. The data streams are then forwarded on one or several links to and from a dedicated external server, which may be referred to as an aggregation server or gateway. The different links can thereby form a single virtual link between a router and the gateway.

The evaluation of a data link is can for example be performed by the methods as described in EP 2 943 011 by the same applicant, said document hereby incorporated by reference. Furthermore, the plurality of routers may use any available data links, such as two or more of e.g. GSM, Satellite, DVB-T, HSPA, EDGE, 1×RTT, EVDO, LTE, WiFi (802.11) and WiMAX; and combine them into one virtual network connection. In particular, it is preferred to use data links provided through wireless wide-area network (WWAN) communication technologies.

In light of the technological developments during the last decade the present inventors realized that conventional communication systems for moving vehicles will not be able to handle the increased amount of data traffic without significant changes.

As discussed in the background section, MIMO-systems are not particularly compatible with current systems using only one single router in a centrally positioned carriage. Moreover, it is not very practical to distribute the antennas on different carriages, e.g. two or four antennas on each carriage, since the signal wire (e.g. coaxial cable) connecting each antenna to the single router (or the modem(s) within the router) will need to be very long which would severely degrade the performance of the communication system due to high losses. Moreover, distributing antennas along the plurality of carriages would also be problematic due to the fact that one would need to handle tedious connections between carriages and furthermore the carriage configurations would be rather complicated.

The invention is based on the realization that in order to increase the MIMO capabilities of an onboard communication system one should aim to maximize the separation between the antennas. For example, a 2×2 MIMO system, where two antennas have the same polarization, should have the antennas maximally separated from each other in order to improve communication performance. Generally, the onboard mobile access router is nowadays provided with 6 or more modems, and with each modem being connected to two or more antennas, the number of antennas that need to be mounted on the exterior of the carriage quickly exceeds practical limitations, especially if one is to maximize the separation between each antenna pair on the roof of the carriage. As mentioned, the two antennas should preferably be maximally separated, and furthermore, no other antennas should be placed in between these two in order to optimize performance. However, by means of the present invention, the antennas may be maximally separated, since antennas for different links may be arranged on different carriages. Thus, a router providing only one link may have MIMO-antennas distributed at the edges and/or corners of the carriage, providing maximum separation.

Thus, the inventors realized that by having a distributed communication system, i.e. a plurality of routers positioned in different separate carriages instead of one single centrally positioned router, many advantageous effects can be achieved. The distributed routers are completely standalone and independent, thus there is no main or master router, but rather "peer routers". Moreover, by configuring the routers to be able to communicate with each other through an onboard router network data streams can efficiently be distributed among the plurality of routers and the corresponding exterior network connections. Thus, each router can "borrow" bandwidth capacity from any one of the other routers onboard the vehicle. This results in a superior communication system in terms of capacity and bandwidth capability. Moreover, the communication system is more robust as compared to conventional systems. For example, if one router would temporarily not be able to communicate with an exterior mobile network due to e.g. software/hardware malfunction, poor network coverage, signal obstruction, etc., the data packets received from and sent to clients can instead be routed to other routers onboard the vehicle. Also, since each router is standalone and independent the communication system is less dependent on one single router.

In accordance with another exemplary embodiment, each router comprises a plurality of modems for communication with the at least one exterior mobile network, wherein each modem is connectable to at least two external antennas in order to enable MIMO communication. Thus, the router may comprise several antenna ports per modem, enabling MIMO for the external communication, and the high bandwidth thereby provided can then be distributed to the internal clients with e.g. 802.11n. The modems comprised by each router may share a plurality of antennas, i.e. there may be for example two or four antennas arranged on the roof of a carriage which can only be utilized by one modem at the time. Alternatively a carriage having a router may have two or more antenna configurations, each antenna configuration including a plurality of antennas distributed on the exterior of the carriage, and where each configuration is simultaneously usable by two or more modems.

For example, a carriage may have two antennas at a front end portion and two antennas at a rear end portion of the roof which can either define one side of one 4×4 MIMO system or one side of two 2×2 MIMO systems. Where, one side of a MIMO system is to be understood as that the moving vehicle being "a side" and a base station of an exterior mobile network is "the other side".

According to yet another exemplary embodiment the wireless communication system further comprises a distributed database including at least one of available bandwidth of each data link of each router, a current mobile network operator of each router, a set of signal parameters for each data link of each router, a network topology of the onboard router network, a number of routers in the onboard router network and an IP-address of each router in the onboard router network. By providing a database in the system comprising certain parameters that are accessible by each router or each controller a simple and efficient distributed communication system can be realized. The distributed database can be a plurality of databases, e.g. one for each router connected to the onboard router network. The distributed database(s) can then be kept continuously synchronized between the different routers connected to the onboard router network in order to ensure that each router has access to the same information at all times. The distributed database may further include the network topology of the routers onboard the vehicle, i.e. how they are connected to each other and if for example packets from a first router must pass through a second router in order to reach a third router, or if there is a direct communication path from the first to the third router, and so on. The controller(s) may then, in accordance with another exemplary embodiment, also be configured to retrieve information from the distributed database and assign data streams at least partly based on the retrieved information.

Further, in accordance with yet another exemplary embodiment, each router of the plurality of routers is associated with a different mobile network operator. Thus, if a specific network operator has poor network coverage in certain areas, other routers within the same moving vehicle having other network operators with better network coverage can be used to handle some of the data traffic.

Moreover, each router may further comprise a subscriber identity module (SIM) pool including a plurality of SIMs, and wherein the controller is capable of periodically assigning SIMs within the SIM pool to any one of the plurality of routers through the onboard router network. By including a SIM pooling capability in the system the number SIM cards (SIMs) and also the number of modems in the system can be reduced. By using a common pool of SIMs, accessible to each of the plurality of routers, the total number of SIMs may be reduced, and the SIMs available may be used more efficiently. At the same time, the accessibility for each router (or the modems within each router) to an adequate SIM at each time increases since the number of accessible SIMs can hereby be managed more efficiently.

The term "periodically" is here used to indicate an assignment which is not fixed, but which is established temporarily, for a certain period of time. These periodical assignments are preferably established in an optimized way, based on one or several optimization rules handled by the controller, as is discussed in more detail in the following.

Furthermore, the need for stocking up each router with a large number of SIMs, where a number of those may be identical in several of the routers onboard, is diminished. Thus, since there is no need for having a large number of SIMs in each router, the number of modems in each router may be reduced. Moreover, the number of modems can further be reduced since there is a smaller number of modems required to establish adequate communication quality, since it now becomes possible to use each modem more efficiently.

In particular, it hereby becomes possible to provide access for each router to one or several suitable SIM(s) in every country in which the vehicle may travel.

Further, due to the pooling of all available SIMs in the system, the probability that each router is provided with a working connection to an exterior mobile network at all times increases. In other words, the probability of a scenario where one of the routers would have no SIM that is currently associated with an operator having network coverage in a particular area is reduced.

Pooling of SIM cards is per se known from EP 2 518 977 by the same applicant, said document hereby being incorporated by reference.

In the above-discussed SIM pool embodiment, the SIM cards forming the SIM pool may be arranged in one of the mobile routers, and being accessible for modems from all the mobile routers. Alternatively, the SIMs of the SIM pool may be distributed, and arranged in smaller parts in several or all the mobile routers. As yet another alternative, the SIM pool may be arranged at another unit on-board the vehicle. Thus, in any of these alternatives, instead of having the SIM cards hardwired to each modem, the SIM card traffic is routed via a software serial multiplexer in each router's operating system. The software serial multiplexer can route the SIM card traffic between an arbitrary SIM card in the router, or on other routers or units, and an arbitrary modem in the router. This allows any modem to use any SIM card.

The alternative where SIMs are pooled between routers on the vehicle may be referred to as remote SIM with on-board SIM pool. Since SIM card traffic intermediately exists as data in the operating system, and since the SIM card communication protocol is fairly resistant to latency, the SIM card traffic can be transferred over more or less arbitrary communication links. One example of such a communication network is the ethernet backbone of a vehicle. It is therefore possible to allow a modem in one router onboard a vehicle to use a SIM card that is physically located inside another router, or other device, onboard the same vehicle. If the connectivity to the vehicle is supplied by a distributed set of routers, all routers in the set can share a common pool of SIM cards that can be assigned in an arbitrary way.

It is also possible to arrange the SIM pool on a specific unit onboard the vehicle, such as in one of the routers or on a separate unit. Still further, the SIM pool may be arranged outside the vehicle. Such an embodiment may be referred to as remote SIM with central SIM pool. It has been found that in addition to the previous case, and with wwan links with low enough latency, it is also possible to send the SIM card traffic over the internet. It is therefore possible to have a router with a plurality of modems and only one or a few SIM cards physically located inside the router. These SIM cards can preferably be of a type that can roam to any other operator's network, even if this implies higher data cost. This, or these, physical SIM card(s) is only used for the initial communication with a central SIM card bank, to get the first SIM card identity. Once at least one other modem is connected using a remote SIM identity, further communication with the central SIM card bank can be done over this established link.

As an example, the connection method for a system with four modems, 1-4, an abstract tunnel T that aggregates all the modems, one SIM card physically located in the router, X, and four SIM cards physically located in a central SIM card bank, A-D, can look like this:

Modem 1 connects to the mobile network with SIM card X.
Tunnel T is established over modem 1.
Modem 2 connects to the mobile network with SIM card B, with the traffic going over tunnel T.
Tunnel T is extended with modem 2.
Modem 1 is removed from tunnel T.
Modem 1 disconnects from the mobile network with SIM card X.
Modem 1 connects to the mobile network with SIM card A, with the traffic going over tunnel T.
Tunnel T is extended with modem 1.
Modem 3 connects to the mobile network with SIM card C, with the traffic going over tunnel T.
Tunnel T is extended with modem 3.
Modem 4 connects to the mobile network with SIM card D, with the traffic going over tunnel T.
Tunnel T is extended with modem 4.

As long as at least one modem is up, the tunnel remains up and all modems can communicate with their SIM cards in the central SIM card bank. If all modems disconnects simultaneously, the algorithm restarts from the beginning.

The SIM cards for pooling in any of the above-discussed ways need not be physical SIM cards, arranged locally or centrally, but software SIMs, also referred to as E-SIM, soft SIM or virtual SIM, may also be used. E-SIM/Virtual SIM is a method where the SIM identity is electronically transferred from a central service to a SIM-circuit or a smart-SIM-card inside the router. This smart SIM/SIM-circuit can hold multiple SIMs identities at the same time. Normally you can only use one SIM identity at the same time, so each modem needs one smart SIM-card or SIM-circuit per modem. So when the SIM-identity is downloaded to the router, they can be used without communication with the central service/server.

If you have four modems and four smart-SIM/SIM-circuits and each SIM circuit/smart modem have five SIM-identities, then it's possible to travel through five countries and shift subscription at each border and have all four modems connected at all time without communicating with the central server/service. In this case twenty subscriptions are used.

Using this technology it is also possible to change SIM-identity/subscription without changing physical SIM-cards. This method has the advantages of the SIM-multiplexer and the Remote SIM without their weaknesses of having the administration of physical SIM-cards.

Sharing/pooling of the SIM-cards between carriages, and possibly even between vehicles, provides many advantages. For example, the amount of data being forwarded through various modems and SIMS may vary greatly, both over time, and between different carriages and vehicles. Many SIMs have a cap on the available monthly data amount, and if you pass that cap, the communication through the SIM will restricted/throttled, so that transmission will occur at very limited data speed on that SIM/subscription during the rest of the month. On the other hand, if the available data for each SIMs/subscriptions are not used for a certain month, it can often not be saved for later, which means that you pay for resources that you do not use. By distributing and sharing the SIM capacity, the available amount of data traffic can be distributed and used more efficiently. Hereby, it becomes possible to use fewer SIMs without any reduction in performance, or to obtain an improved performance.

Further, SIM pooling makes the change of subscription plans etc easier to handle, especially when the SIM cards are arranged externally rom the vehicle, or even are non-existent (E-SIM/virtual SIM). Many subscriptions are locked to a physical SIM, changing subscription plan or operator may require that you are changing the physical SIMs in the onboard router. Shipping SIM-cards out to customers is tedious and expensive, and then someone needs to open the router and fit physical SIM-cards inside the router. This takes time, needs planning and logistics. If something goes wrong you may need to send back and change one or several SIMs. This is very resource demanding activities. In the case you want to change or add a new cellular operator to the router, you need to change and fit new physical SIMs inside the router. This is much easier to handle if you have all SIMs arranged centrally in a separate location outside the vehicle (remote SIM with external SIM pool), or have the SIMs in virtual firm.

Further, as already indicated, the use of a central SIM pool, be it with physical or virtual SIMs, also enabling pooling between vehicles, and not only between carriages within a single vehicle. Hereby, the distribution and use of SIMs can be administered and handled even more efficiently. For example, this may be used for handling all SIMs for entire fleets of busses, trains or the like. Hereby, the utilization of data capacity for each SIM can be optimized. For example, SIMs for a vehicle having low data traffic can periodically be exchanged with SIMs from a vehicle having high data traffic, SIMs for vehicles being periodically out of traffic may be removed and use elsewhere, SIMs having reached the cap limit for the present month may be taken out of use and replaced with other SIMs until the end of the month, etc. These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to a train is disclosed. However, it is to be acknowledged by the skilled reader that the method and system are correspondingly useable on other moving vehicles having a plurality of carriages, such as trams and the like.

Figure 1:
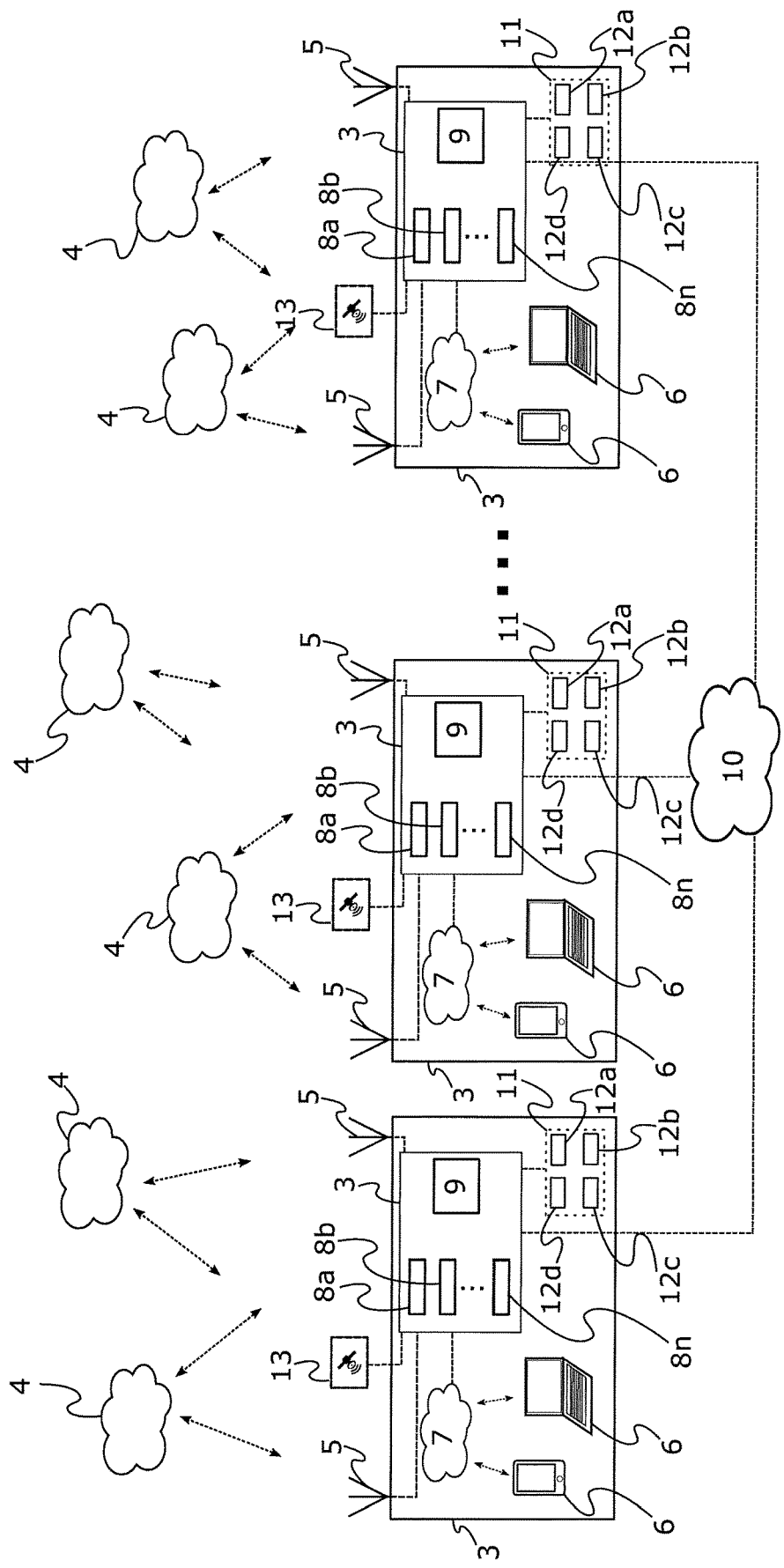
FIG. 1 is a schematic illustration of a train having a wireless communication system in accordance with an embodiment of the present invention.

FIG. 1 shows a schematic illustration of a vehicle 1, in the form of a train 1, having a plurality of carriages 2, three of which are shown in this figure. The train 1 has a communication system comprising a plurality of data communication routers 3, or simply routers 3, arranged in separate carriages 2 of the vehicle 1. In this particular illustration each carriage 2 is provided with a router 3, however, in other embodiments of the invention only some specific carriages 2 may be provided with a router 3, such as e.g. a front passenger carriage, a rear passenger carriage and a café or restaurant carriage. The data communication routers 3 may also be denominated MAR (Mobile Access Router) or MAAR (Mobile Access and Applications Router).

Each router 3 is configured to receive and transmit wireless data communication to and from a stationary communication server through at least one exterior mobile network 4, e.g. external wide area networks (WANs), as indicated by the dashed arrows. Communication to and from the exterior mobile networks 4 is provided via one or several antennas 5. The exterior mobile network 4 accordingly provides one data link or several data links between each router 3 and the stationary communication server. In the case where two or more data links are available they can either be between the router 3 and one of the exterior mobile networks 4 and/or by using several exterior mobile networks 4 simultaneously.

Moreover, the routers 3 are configured to receive and transmit data packets to and from one or more clients 6 onboard the vehicle 1 through an internal local area network (LAN) 7. The LAN 7 is preferably a wireless network, using one or several internal antennas to communicate with clients 6 or terminal units 6 within the vehicle 1. The client(s) may be computing devices such as laptops, mobile telephones, PDAs and so on. It is also possible to use a wired network within the vehicle 1. Each router 3 is preferably connected to or part of a separate and different LAN 7 as compared to the other routers 3 within the vehicle 1, for example, if each carriage 2 is provided with one router 3 then each carriage 2 is provided with a separate LAN 7.

The routers 3 are furthermore connected to each other through an onboard router network 10 in order to receive and transmit data packets to and from each other. This enables each router 3 within the wireless communication system of the vehicle 1 to "assist" each other by distributing data traffic from the client(s) 6 onboard the vehicle 1 among each other.

The communication system further comprises one or several controllers 9, in this illustration each router 3 is provided with an individual controller 9 that is configured to evaluate a set of performance parameters of the data link(s) between each router 3 and the exterior mobile network(s) 4. The controllers are then to assign data streams to the different data links through the onboard router network 10 at least partly based on this evaluation of the performance parameters. It is also possible to use only one single controller in operable connection with each of the routers 3 onboard the moving vehicle.

The plurality of routers 3 are arranged to communicate on several different communication routes having different characteristics, in some embodiments each router 3 is configured to communicate on at least two different communication routes having different characteristics. However, the system allows for the different routers 3 within the train to have separate and different communication routes to and from the exterior mobile network 4, e.g. owned by different network operators. The various data streams can be transferred and distributed among the plurality of routers on the different data links, based on e.g. available bandwidth, such that clients 6 onboard the train 1, are always sure to receive the best data connection available.

The transferring of data streams through different data links may additionally or alternatively comprises the two main steps: evaluation and assignment. Each of these permits some variability. Numerous types of tests, generating a predictable response, such as an echo, could be performed to evaluate link quality, and such tests can be combined in any order, serially or in parallel. The following are only examples.

Any of a variety of common Internet functions can be taken to indicate the usefulness of a link. For example, a WWAN Internet service provider (ISP) will normally offer the addresses of one or more domain name system (DNS) servers, an essential service. DNS queries can be bound to each link, to attempt to resolve a largely arbitrary domain name using one of the ISP's provided servers, or any other. Failure to respond within a given time frame is taken to mean either a general problem transferring the small amount of data, or a more specific problem with the queried DNS server.

If the queried DNS server belongs to the ISP, the latter will often indicate a severe problem at the ISP for that specific link. Because a DNS request typically consists of a single UDP or TCP packet going each way, this type of test is very light. The infrastructure typically prioritize DNS queries and DNS responses highly in traffic control algorithms, which is another reason why this type of test can be expected to complete very quickly, if at all. The timeout on it can therefore be set very low, producing high responsiveness. The lightness of a DNS test is both an advantage and, to some extent, a drawback. It detects qualitative problems, and is very quick. It also results in a low transfer of data, and does not strain the link, which in turn means that the tests can be repeated very frequently. However, because it does not strain the link, it is a poor indicator of quantitative performance.

Another example of an embodiment therefore uses the ICMP protocol. In this protocol, an ECHO_REQUEST datagram is used to elicit an ECHO_RESPONSE from an arbitrary remote host, preferably a very stable one.

In normal use, ICMP testing is light in the same way as DNS testing. In addition, it is easier for ISPs to prioritize ICMP in unknown ways, because it is a special protocol and does not represent an essential service. Unpadded ICMP requests are likely to receive a very high priority, because ICMP is a standard test of network latency. When highly prioritized, it gives the illusion of good overall responsiveness, while payload data in other types of containers gets a lower priority and relatively poor performance in case of congestion.

As part of the protocol, ICMP packets can be padded with extra bytes of data. This provides a simple, universally recognized method of loading down a link with a very precise burst of traffic, and timing the response. The fact that one and the same packet constitutes the load and is timed is the greatest virtue of this test, because it measures how heavy traffic on a link will actually be treated. In practice, there is often a substantial difference in how a stream of ICMP packets is treated, depending on their size. When padded packets fail to arrive under a given timeout, this is an indicator of performance problems.

The ICMP request may be sent to any type of stationary communication server accessible through the exterior network, such as a DNS server, a gateway through which the communication from the moving vehicle is transferred, a content provider server, or the like.

These embodiments for evaluation mentioned thus far can be generalized as one: any active sending of a request or other provocation across a network, through a specific link, with the expectation of receiving a response under a timeout or corresponding safeguard. Variations on this theme include factors such as protocol, target host location, the amount of traffic sent and solicited, and the precise limit set by the timeout function. Obviously, factors external to the individual test, such as the interval between repetitions of the same type of test, is also a potential subject of fine tuning.

These and other methods for evaluation are known from EP 2 943 011 by the same applicant, said document hereby incorporated by reference.

In addition or as an alternative, the evaluation can also be made on the pay-load, i.e. the transmitted data streams, by identification and evaluation of response times, etc.

The system may also comprise a global positioning system (GPS) receiver 13 for receiving GPS signals indicative of the current position of the vehicle, and wherein the controller may be arranged to assign data streams to various data links also partly in dependence on said received GPS signals.

Furthermore, the router comprises a plurality of SIMs 12a-d. The number of SIMs is in this particular illustration 4, but preferably at least two, such as e.g. six, ten or twelve. The SIMs 12 form a common SIM pool 11, accessible for each of the modems 8a-N within each router, and also to each different router 3 connected to the onboard router network 10 within the vehicle 1. The SIMs 12 are preferably SIM cards, and the SIM pool 11 is realized as a SIM card holder, comprising a plurality of slots for receiving a plurality of SIM cards. Periodical assignment of one or several of the SIM(s) to any modem is controlled by the controller(s) 9.

The assignment of SIMs to modems at every specific time is preferably determined based on a set of rules in the controller. The set of rules may e.g. be used to assign SIMs to the modems based on information such as in which country the vehicle is currently travelling, the amount of data that has been conveyed by use of the different SIMs, the current price related to conveying data through the different SIMs, the type of data being conveyed, etc.

The controller 9 is preferably arranged to assign each SIM within said SIM pool only to one router (or one modem within one router) at a time. Hereby, each SIM at any given time only has one user, but the assigned user may vary over time.

The pooling of SIM cards within a single router is per se known from EP 2 518 977, by the same applicant, said document hereby incorporated by reference. However, it was found surprisingly beneficial to pool a set of SIMs 12 in each router 3 and make each SIM pool 11 available to each router through the onboard router network 10, to further improve system performance.

Figure 2:
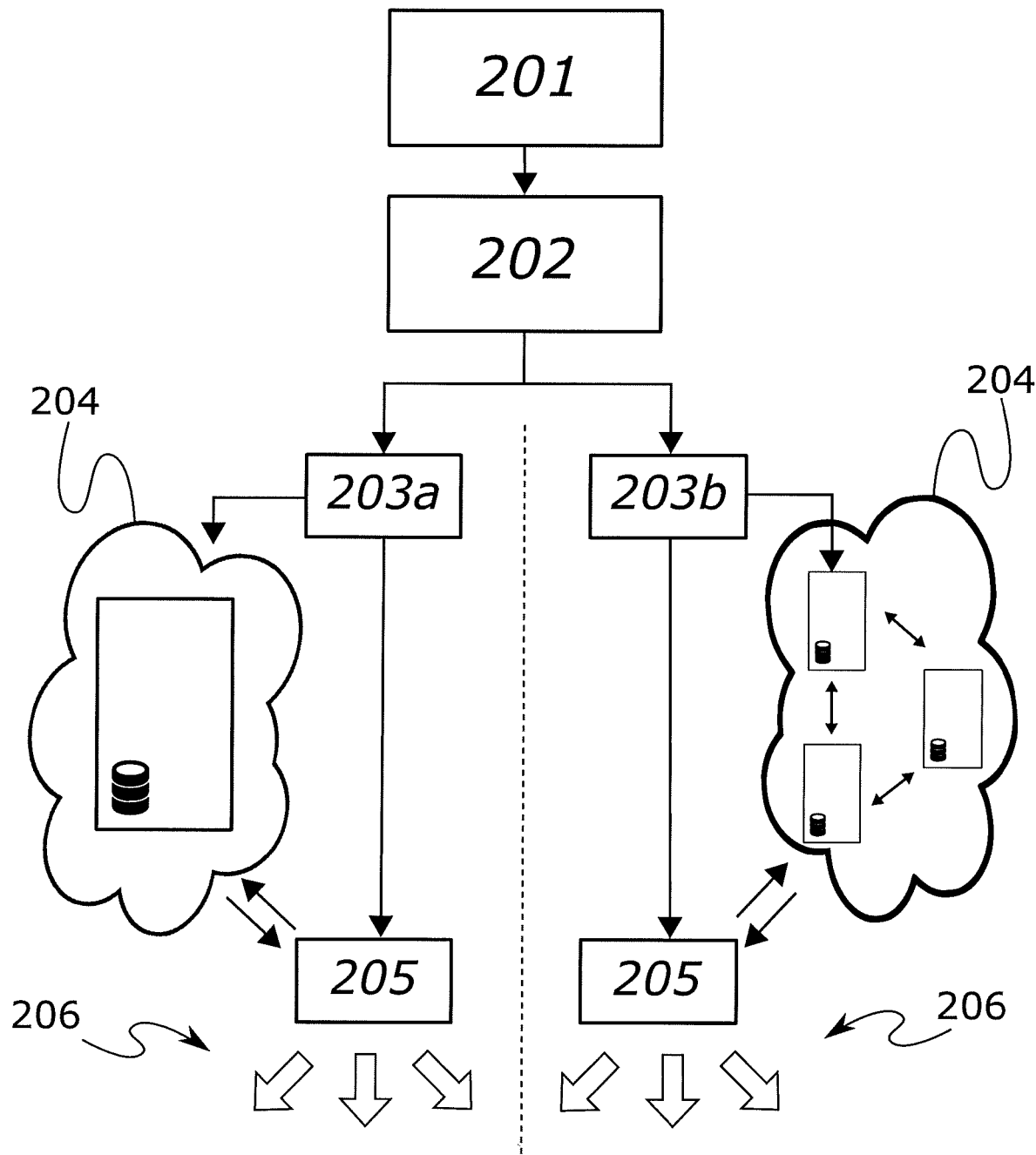
FIG. 2 is a schematic flow chart illustrating an operating sequence of a router in accordance with an embodiment of the invention.

FIG. 2 shows a schematic flow chart illustrating an operating sequence in accordance with an embodiment of the invention. When a router in the communication system is powered on and has performed a first booting sequence, it is configured to detect 201 other routers connected to the onboard router network. This can for example be done by scanning the router network on certain predefined IP address ranges that are intended to be used by the plurality of routers onboard, such as e.g. 10.101.0.0/24. This can for example be performed by broadcasting ARP (Address Resolution Protocol) probe packets. Once, the router has determined which other routers are connected to the onboard router network, it selects 202 an available IP-address and proceeds to a subsequent step. The other already operative routers in the onboard router network may accordingly note that a new router has joined the onboard router network and its IP-address.

Next, a distributed database 204 is formed 203a-b by one or several controllers in the system. The distributed database 204 contains information about each router in the network, more specifically the database 204 may for example contain information about: estimated available bandwidth of each data link of each router, a current mobile network operator of each router, a set of signal parameters for each data link of each router, amount of data that is handled by each specific modem in each router, a network topology of said onboard router network, a number of routers in said onboard router network and an IP-address of each router in said onboard router network, (the list being non-exhaustive). The distributed database 204 is then updated or synchronized by the routers so that each router has access to real-time information about all routers in the communication system. The updating and synchronization can be performed at predefined discrete time intervals or continuously.

The distributed database 204 can either be formed 203a as one common database accessible by each router (or the controller in each router) in the onboard router network or formed 203b as several databases, one for each router in the onboard router network, each of which is accessible by each router. If several databases are used they are kept synchronized so that each router can access the same information as other routers in the onboard router network, the synchronization can for example be done by using open source software such as SymmetricDS.

Further each router provides a communication path between clients connected to the same internal LAN as the router and an exterior mobile network. The data packets from the client(s) that are connected to the same LAN can be routed through "local" modems and/or modems of other routers in the onboard router network. This is preferably done in accordance with the SureWAN™ protocol developed by the present applicant.

The sharing of modems between the plurality of routers in the train can for example be performed by establishing a plurality of tunnels between each router, or by forming different Virtual LANs (VLANs).

Continuingly, the sequence includes a step of evaluating 205 the data links available in the communication system and accordingly assigning 206 data streams based on this evaluation. The evaluation 205 preferably includes retrieving relevant information from the distributed database, e.g. checking for available bandwidth provided by other routers in the onboard router network.

The invention claimed is:

1. A wireless communication system for a moving vehicle having a plurality of carriages, said wireless communication system comprising:
   a plurality of routers, each router being arranged in a separate carriage and each router being configured to:
      receive and transmit wireless data communication to and from a stationary communication server outside said moving vehicle through at least one exterior mobile network via at least one external antenna, wherein said at least one exterior mobile network provides at least one data link;
      receive and transmit data packets to and from at least one client onboard the moving vehicle;
      communicate with every other router in said moving vehicle in order to receive and transmit data packets to and from said every other router, thereby forming an onboard router network;
   at least one controller configured to evaluate a set of performance parameters of said at least one data link between each router and said at least one exterior mobile network and to assign data streams to said at least one data link, through said onboard router network, at least partly based on said evaluated set of performance parameters,
   wherein each router comprises a plurality of modems for communication with said at least one exterior mobile network, wherein each modem is accessible by each router of the plurality of routers through said onboard router network, wherein for each router at least one of said modems is connectable to at least two of said external antennas in order to enable multiple input multiple output (MIMO) communication wherein the at least two external antennas are arranged close to the fore and aft end of the carriage, respectively.

2. The wireless communication system according to claim 1, wherein all of said modems are connectable to at least two external antennas in order to enable MIMO communication.

3. The wireless communication system according to claim 1, further comprising a distributed database including at least one of available bandwidth of each data link of each router, a current mobile network operator of each router, a set of signal parameters for each data link of each router, a network topology of said onboard router network, a number of routers in said onboard router network and an IP-address of each router in said onboard router network.

4. The wireless communication system according to claim 3, wherein said controller is configured to retrieve information from said distributed database and assign data streams based on said retrieved information.

5. The wireless communication system according to claim 3, wherein said at least one controller is configured to continuously update said distributed database.

6. The wireless communication system according to claim 3, wherein said wireless communication system comprises one controller for each router and wherein each controller is configured to:
   evaluate a set of performance parameters of said at least one data link between the router and said at least one exterior mobile network, in order to assign data streams to said at least one data link, through said onboard router network, based on said evaluated set of performance parameters.

7. The wireless communication system according to claim 1, wherein said moving vehicle only comprises a router in a front passenger carriage and a router in an end passenger carriage.

8. The wireless communication system according to claim 1, wherein said moving vehicle only comprises a router in a front passenger carriage, a router in a café carriage and a router in a back passenger carriage.

9. The wireless communication system according to claim 1, wherein each router is associated with a different mobile network operator.

10. The wireless communication system according to claim 1, wherein each router further comprises a subscriber identity module (SIM) pool including a plurality of SIMs, and wherein said controller is capable of periodically assigning SIMs within said SIM pool to any one of said plurality of routers through said onboard router network.

11. The wireless communication system according to claim 1, wherein at least one router further has access to at least one SIM in another router.

12. The wireless communication system according to claim 1, wherein at least one router further has access to at least one SIM arranged externally from the vehicle.

13. The wireless communication system according to claim 11, wherein the SIMs of the routers form a common, distributed SIM pool.

14. The wireless communication system according to claim 12, wherein the external SIMs form a common central SIM pool accessible for more than one router within the vehicle, and/or for more than one vehicle.

15. The wireless communication system of claim 1, wherein each of said plurality of routers is a standalone and independent router, the plurality of routers forming a distributed peer-to-peer network.

16. The wireless communication system of claim 6, wherein each of said plurality of routers is a standalone and independent router, the plurality of routers forming a distributed peer-to-peer network.

17. The wireless communication system of claim 1, wherein each router is arranged to communicate on at least one different data link as compared to the other routers onboard the moving vehicle, and wherein data streams on one or several of said links are forwarded to a dedicated aggregation server, the different links thereby forming a single virtual link.

* * * * *